Patented July 17, 1923.

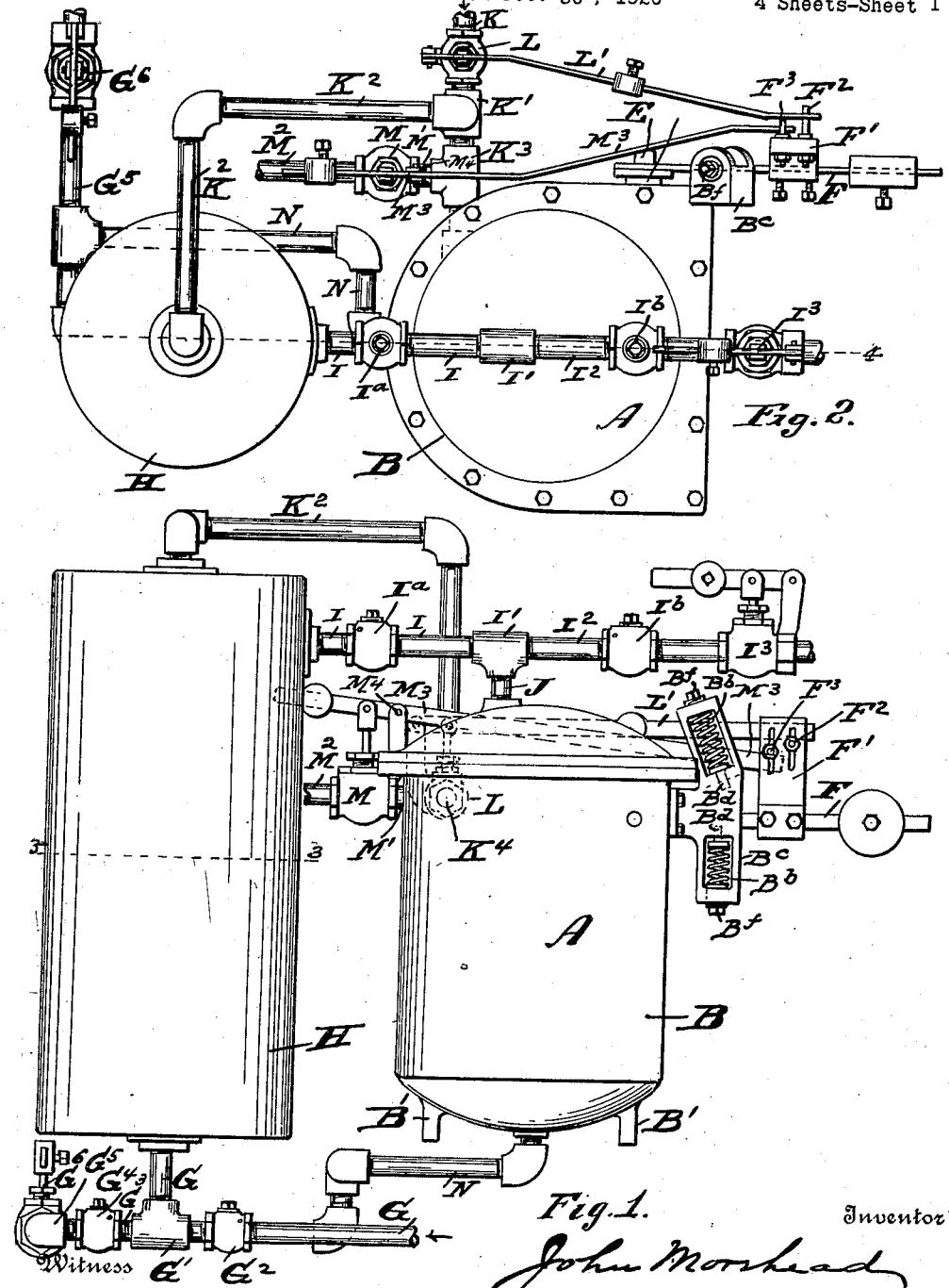

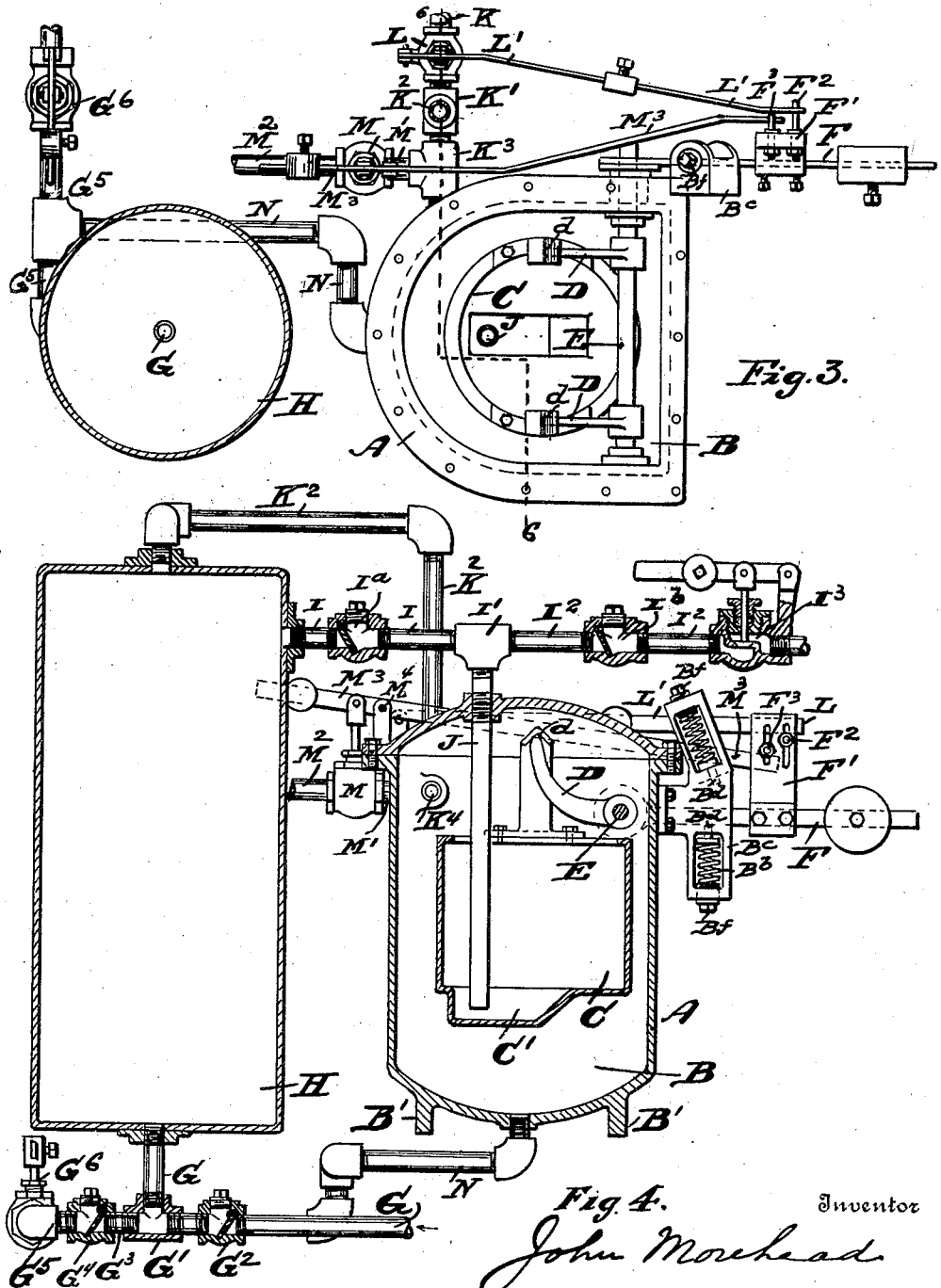

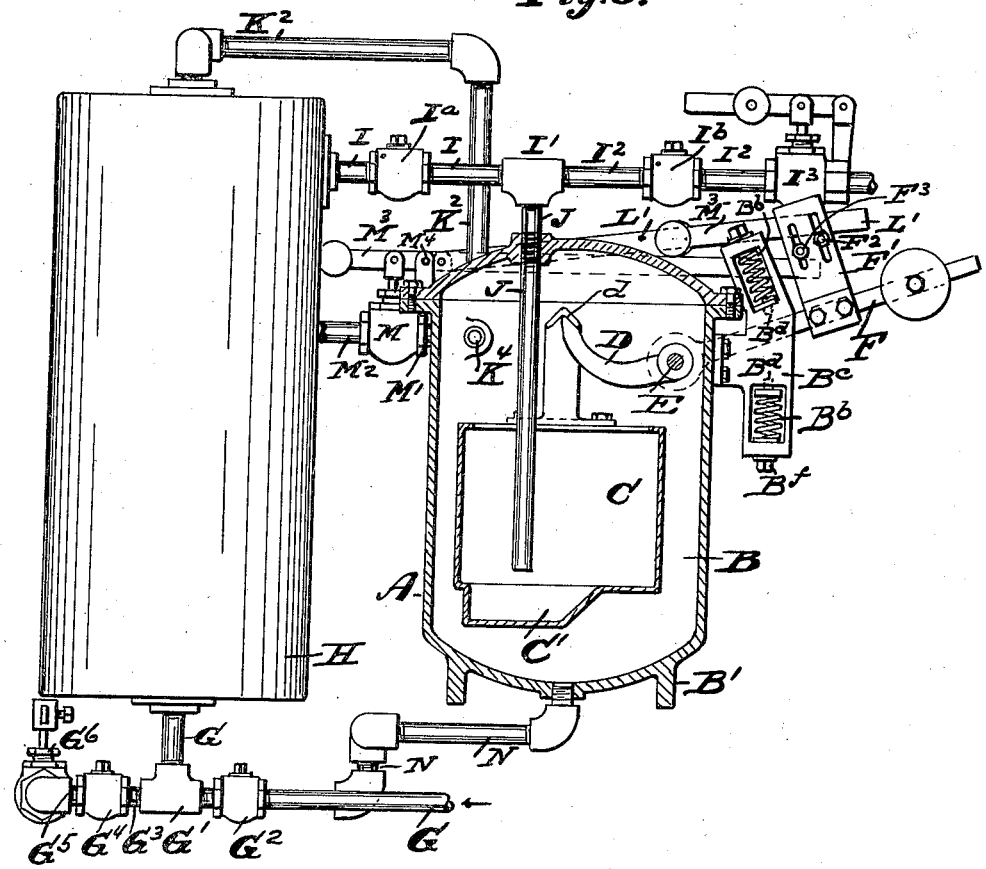

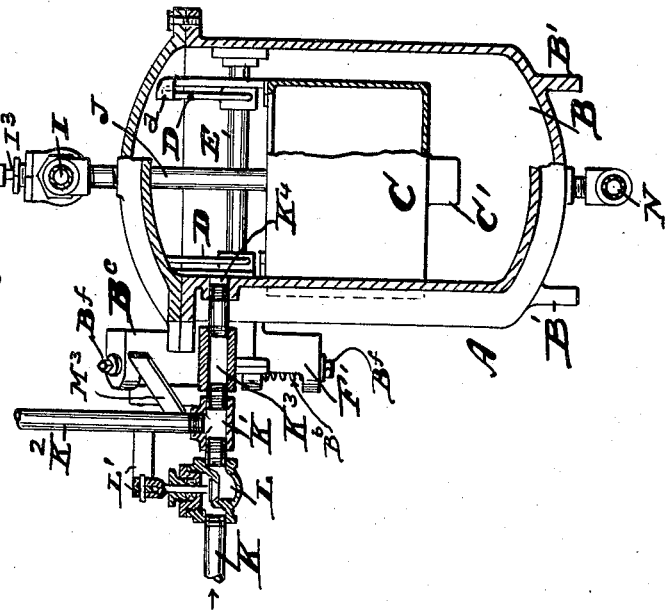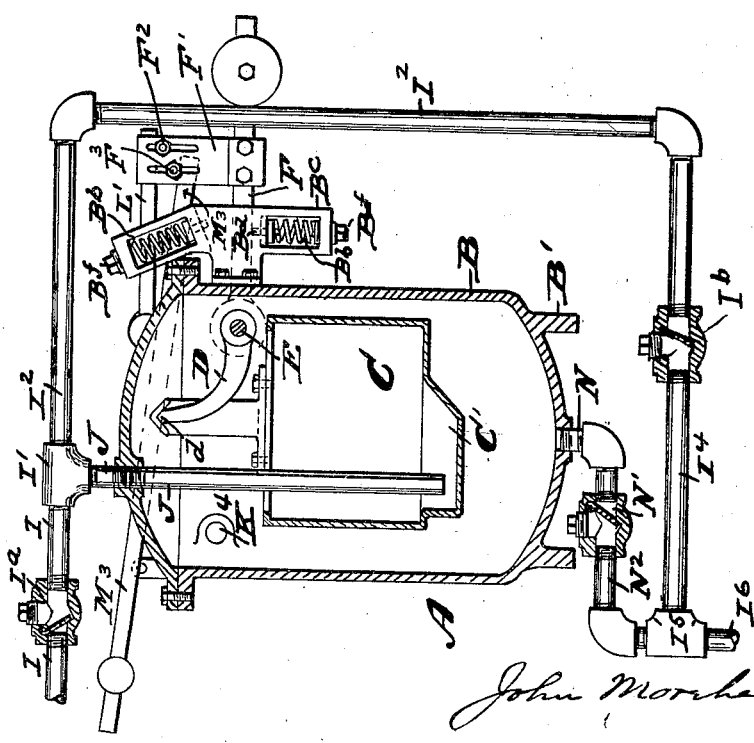

1,462,144

UNITED STATES PATENT OFFICE.

JOHN MOREHEAD, OF DETROIT, MICHIGAN.

STEAM TRAP.

Application filed December 30, 1920. Serial No. 433,989.

*To all whom it may concern:*

Be it known that I, JOHN MOREHEAD, citizen of the United States, residing at Detroit, county of Wayne, State of Michigan, have invented a certain new and useful Improvement in Steam Traps, and declare the following to be a full, clear, and exact description of the same, such as will enable others skilled in the art to which it pertains to make and use the same, reference being had to the accompanying drawings, which form a part of this specification.

My invention relates to steam traps shown in the accompanying drawings and more particularly described in the following specification and claims.

The present invention is an improvement on the steam trap shown and described in my U. S. Patent #1,352,617, dated September 14, 1920,—and one object of the present invention is the elimination of the valve in the inner suspended chamber through which condensation passes to the outer chamber and thence back to the boiler or other place of discharge.

A further object of the invention is to provide a fixed tank adapted to receive condensation for delivery to the trap which may be of relatively small capacity, the purpose being to handle a relatively large volume of water with a comparatively small trap.

With the foregoing and other objects in view which will appear as the description proceeds, the invention further resides in the combination and arrangement of parts and in the details of construction hereinafter described and claimed, it being understood that changes may be made in the precise embodiment of the invention herein disclosed without departing from the spirit of the same.

In the accompanying drawings forming part of this specification:—

Figure 1 is a side elevation of the trap and the receiving tank, showing the connections leading from a heating system to the tank and from the latter to the trap and thence to the point of discharge.

Figure 2 is a plan view of the same.

Figure 3 is a plan view partly in section taken on or about line 3—3 of Figure 1, with the trap cover removed.

Figure 4 is a vertical cross-sectional view taken on or about line 4—4 of Figure 2, showing the suspended inner tank in its most elevated position, as when receiving condensation from a heating system.

Figure 5 is a similar cross-sectional view through the trap showing the suspended inner tank in its lowermost position as when steam is being delivered to the trap and the condensation discharged therefrom, the receiving tank being shown in elevation.

Figure 6 is a cross-sectional view taken on or about line 6—6 of Figure 3.

Figure 7 is a cross-sectional view of the trap with the receiving tank eliminated:— the condensation being delivered directly to the tank.

Referring now to the letters of reference placed upon the drawings:

A, denotes the trap comprising a vertical stationary chamber B, having legs B' adapted to stand upon a suitable support. C, indicates a movable tank suspended from knife edge pivots $d$, at the end of the rocker-arms D, D, which are in turn secured to a rock shaft E, journaled in suitable bearings provided within the stationary chamber.

One end of the rock shaft E extends through a suitable packing gland in the wall of the chamber and is fitted on the outside of the trap with a rocker-arm or weighted lever F, designed to normally maintain the tank C, in its most elevated position, until depressed by the weight of water or condensation delivered to the tank.

G, is a pipe leading from a heating or other condensing system (not shown) to a stationary receiving tank H, through a T G'. $G^2$ is a check valve in the pipe G to prevent the return of the condensation to the heating system. $G^3$ is a nipple connecting the T G' with a check valve $G^4$, in a pipe $G^5$ leading to a hot water heater, trap, or other point of discharge (not shown).

$G^6$ is a back pressure valve in the pipe $G^5$ to control the pressure from the heating system in order that the condensation may enter the receiving tank. I is an overflow pipe leading from the tank H to a T I' from which a pipe J, extends downwardly through the stationary chamber of the trap that it may discharge into the movable tank C;—provided with a shallow pocket C' into which the end of the pipe extends when the tank is in its elevated or normal position.

$I^a$ is a check valve in the pipe line I to close against the return of the condensation to the tank H. $I^2$ is a pipe leading from the T of the pipe I' to the water heater, or other place of discharge (not shown). $I^3$ is a suitable back pressure valve for controlling the back pressure from the heating system. $I^b$ is a check valve adapted to close against the return of water to the movable tank C.

K, indicates a pipe connecting the dome of a steam boiler (not shown) with the trap A and tank H. L, is a steam valve governing the delivery of steam through the pipe K, to the trap and also to the tank, in turn controlled by a weighted lever L' actuated through the movement of the weighted lever F when the movable tank C descends under the weight of the condensation delivered thereto. The weighted lever F, is provided with a slotted arm F', in which is secured an adjustable finger $F^2$, adapted to bear upon the weighted lever L' to open the steam valve L, upon the tank C descending under the weight of the condensation delivered to the latter. Steam is thus admitted through the pipe K, by way of the T K' through the pipe $K^2$ to the tank H,—and also through the pipe K, T K', T $K^3$, and port $K^4$, into the stationary chamber B of the trap.

M, indicates an air relief valve supported on a nipple M' projecting from the T $K^3$. A pipe $M^2$ may connect the valve to any suitable point of discharge. $M^3$ is a weighted lever for controlling the valve M fulcrumed at $M^4$ on an arm extending upwardly from the valve chamber. The weighted lever $M^3$ is in turn controlled by the movement of the weighted lever F;—there being an adjustable pin $F^3$ supported in the slot of the member F', which is adapted to bear upon the lever $M^3$ to open the air relief valve upon the discharge of the condensation from the movable tank C and simultaneously with the closing of the steam valve L. When the condensation has been discharged from the tank C, the weighted lever F, will operate to raise the tank to its uppermost position to again receive condensation from the heating system.

N, is a pipe leading from the bottom of the stationary chamber B, connected by suitable fittings with the pipe $G^5$ in advance of the back pressure valve $G^6$, (as shown in Figure 3 of the drawings) to drain the chamber of any water therein contained upon the water being discharged from the removable tank.

$B^e$ is a bracket bolted to the frame in which is housed a pair of springs $B^b$, carrying plungers $B^d$, adapted to receive the impact of the lever F, upon the latter shifting from one position to the other of its movement, through the operation of the movable tank C;—the weight of the latter being increased or diminished through the delivery or discharge of condensation to or from the tank. $B^f$ are nuts for regulating the tension of the springs as may be required.

Having now indicated the several parts by reference letters the construction and operation of the device will be readily understood.

In Figures 1 to 6 the trap is shown in connection with a stationary receiving tank into which the condensation is initially delivered. Upon filling the stationary tank the condensation passes out through the pipe I to the movable chamber or tank C of the trap, and upon overcoming the action of the weighted lever F due to the increased weight of the movable tank through the delivery of condensation thereto, the lever F will tilt, whereupon the pin $F^2$ carried by the member F' contacts with the weighted lever L' which governing the steam valve L, opens the latter thereby admitting steam from the boiler (not shown) through the pipe K, the pipe K' and thence to the tank;—also through the pipe K, the T $K^3$, and port $K^4$, to the trap. The condensation in the tank H, is thus forced out through the pipe at the bottom of the latter and passes thence through the T G', check valve $G^4$, pipe $G^5$, past the back pressure valve $G^6$, to the tank of the hot water heater, or other place of discharge (not shown). Simultaneously therewith the condensation is also discharged from the movable tank C up through the pipe J, T I', pipe $I^2$, past the check valve $I^b$, and back pressure valve $I^3$ to the tank of the hot water heater or other place of discharge.

Upon the discharge of condensation from the movable tank C, the weighted lever supporting the latter will again become operative to lift the tank to its uppermost position that it may again receive condensation from the stationary tank H, upon the latter overflowing through the pipe I as previously explained. Upon the movable tank C being raised through the action of its weighted lever F, the weighted lever L (controlling the steam valve) will be actuated to cut off the delivery of steam to the stationary tank and the trap. At the same time the air relief valve M will be opened through the tripping action of the pin $F^3$, carried by the support F' of the weighted lever. Thus the stationary tank and trap are relieved of pressure which might otherwise operate to prevent the delivery of condensation thereto.

In Figure 7 I have shown the trap with piping leading directly from a heating system (not shown) to the trap and from the trap to a boiler (not shown)—also connections from the boiler for admission of boiler pressure to the trap.

In this arrangement the trap is installed above the water level of the boiler;—the construction of the trap however is identical with the trap shown in the preceding views, the condensation from the heating system is delivered directly to the trap through the pipe I, check vavlve I$^a$, T I', pipe J, into the movable tank C, which when filled with condensation sufficiently to overcome the weight of the lever F, tilts thereby permitting the steam valve L to open under the action of its weighted lever. Boiler pressure is thereby admitted through the port K$^4$ into the trap;—the steam being delivered upon the top of the water or condensation in the trap, forces the condensation up through the pipe J, through the pipe I$^2$, check valve I$^b$, pipe I$^4$, to the T I$^5$, the condensation flowing thence by gravity through the pipe I$^6$ to the boiler, and any condensation which may have gathered in the stationary chamber B will pass out through the pipe N, check valve N', pipe N$^2$, T I$^5$, and thence by gravity through the pipe I$^6$ to the boiler.

Upon the discharge of the condensation from the movable tank C, the latter is restored to its initial position by the action of the weighted lever F, the steam valve L is thence closed by the operation of its weighted lever and the air relief valve opened by the finger F$^3$ contacting with its weighted lever M$^3$, thereby relieving the trap of undue pressure after the discharge of the condensation, whereby water of condensation from the heating system may again freely enter the trap to operate the movable tank as before explained.

Having thus described my invention what I claim is:

1. In a steam trap, a stationary chamber, a rock-shaft journaled in the stationary chamber having rocker arms, a movable tank suspended from said rocker arms, means for delivering water of condensation from a condensing system to the movable tank, and therefrom to a boiler, means for delivering steam from the boiler to the trap, whereby water of condensation may be forced upwardly and out of the movable chamber by the steam to flow by gravity to the boiler, and a valve for controlling the delivery of steam or boiler pressure to the trap actuated through the movement of the tank.

2. In a steam trap, a stationary chamber, a movable tank housed within the stationary chamber, a rock-shaft journaled within the stationary chamber, rocker arms secured to the rock-shaft from which the movable tank is suspended, pipe connections for delivering condensation from a heating system to the movable tank and therefrom to a boiler, pipe connections for delivering steam from the boiler to the trap, a valve for controlling the admission of steam through the pipe connections to the trap, a weighted lever for controlling said valve, and a weighted arm carried by the rock-shaft adapted to support the movable tank until overcome by the weight of condensation delivered to the tank, said weighted arm being adapted to actuate the weighted lever of the valve controlling the admission of steam to the trap, whereby the condensation may be forced upwardly and out of said trap by the steam to pass by gravity to the boiler.

3. In a steam trap, a stationary chamber, a rock-shaft journaled in the stationary chamber fitted with rocker arms, a movable tank suspended from the rocker arms, a weighted arm carried by the rock-shaft, suitable piping for delivering condensation from a heating system to the trap, a check valve, a vertical pipe leading downwardly from said piping and opening into the movable tank, a water pipe connection leading from said vertical pipe to a place of discharge, a check valve in said water pipe, means for delivering steam from a boiler to the trap whereby boiler pressure may be established in the trap and the water of condensation forced out of the trap up through the vertical pipe and thence through the water pipe connection to the place of discharge.

4. In a steam trap, a stationary chamber, a rock shaft journaled in the stationary chamber provided with rocker-arms, a movable tank suspended from said rocker-arms, pipe connections for delivering steam to the trap, pipe connections for delivering condensation from a heating system to the movable tank and therefrom to a boiler, a steam valve for controlling admission of steam to the trap through said steam pipe connection, a weighted lever for controlling said steam valve, a valve for relieving the pressure in said tank following the discharge of the condensation therefrom controlled by a weighted lever, a weighted arm carried by the rock-shaft adapted to support the tank in an elevated position, adjustable means carried by said arm adapted to alternately actuate the weighted lever of the steam valve and the weighted lever of the relief valve, a bracket bolted to said stationary chamber, and a pair of springs housed in said bracket and spaced apart to receive the impact of the weighted arm of the movable tank resulting from the movement of said tank.

5. In a steam trap, a stationary chamber, a movable tank suspended within the stationary chamber, means for delivering water of condensation to the movable tank, means for delivering steam to the trap to force the water of condensation upwardly and out of the movable tank, a valve for controlling the delivery of steam to the trap and means for actuating said valve at predetermined intervals.

In testimony whereof, I sign this specification in the presence of two witnesses.

JOHN MOREHEAD.

Witnesses:
S. E. THOMAS.
BELLE GUENTHER.